United States Patent
Keller et al.

(10) Patent No.: US 7,190,711 B2
(45) Date of Patent: Mar. 13, 2007

(54) LINEAR SEARCH SYSTEM AND METHOD FOR DETERMINING PSUEDO-NOISE (PN) COMPOSITE PHASE

(75) Inventors: Merle L. Keller, Salt Lake City, UT (US); Vaughn L. Mower, Bountiful, UT (US); Dale D. Fonnesbeck, Kaysville, UT (US)

(73) Assignee: L-3 Communications Corporation, New York, NY (US)

( * ) Notice: Subject to any disclaimer, the term of this patent is extended or adjusted under 35 U.S.C. 154(b) by 768 days.

(21) Appl. No.: 10/242,146

(22) Filed: Sep. 11, 2002

(65) Prior Publication Data

US 2004/0047401 A1 Mar. 11, 2004

(51) Int. Cl.
*H04B 1/00* (2006.01)
(52) U.S. Cl. ..................................................... 375/150
(58) Field of Classification Search ........ 375/132–137, 375/140–150, 130, 208; 380/44, 46, 47, 380/277; 708/250, 200, 255, 422
See application file for complete search history.

(56) References Cited

U.S. PATENT DOCUMENTS

| | | | | |
|---|---|---|---|---|
| 3,665,472 A | * | 5/1972 | Kartchner et al. | 375/222 |
| 3,728,529 A | * | 4/1973 | Kartchner et al. | 708/250 |
| 4,308,617 A | * | 12/1981 | German, Jr. | 375/146 |
| 4,776,012 A | * | 10/1988 | Zscheile et al. | 380/46 |
| 4,809,295 A | * | 2/1989 | Zscheile et al. | 375/142 |
| 5,048,053 A | * | 9/1991 | Mower et al. | 375/149 |
| 5,598,154 A | * | 1/1997 | Wilson et al. | 341/50 |
| 5,689,525 A | * | 11/1997 | Takeishi et al. | 375/141 |
| 6,023,462 A | | 2/2000 | Nieczyporowicz et al. | 370/335 |
| 6,091,760 A | | 7/2000 | Giallorenzi et al. | 375/140 |
| 6,466,958 B1 | | 10/2002 | Van Wechel et al. | 708/422 |
| 7,065,127 B2 | * | 6/2006 | Keller et al. | 375/140 |

* cited by examiner

*Primary Examiner*—Tesfaldet Bocure
*Assistant Examiner*—Vineeta Panwalkar
(74) *Attorney, Agent, or Firm*—Harrington & Smith, PC

(57) ABSTRACT

A method and system for determining Psuedo-Noise (PN) composite phase is provided. The method includes providing at least three relatively prime PN component codes and partially correlating a received PN composite encoded signal with one of the PN component codes. The method also includes partially correlating the received PN composite encoded signal with a second one of the PN component codes while maintaining phase alignment of the first partially phase aligned PN code through the use of normalized autonomous phase numbers (NAPNs). The received PN composite encoded signal is then phase aligned with a receiver PN composite code phase in steps of epoch lengths of the partially phase aligned PN component codes.

29 Claims, 5 Drawing Sheets

LINEAR SEARCH SYSTEM AND METHOD FOR DETERMINING PSUEDO-NOISE (PN) COMPOSITE PHASE

CROSS-REFERENCE TO RELATED APPLICATIONS

This application is related to copending U.S. application Ser. No. 10/058,669, by inventors Merle Keller, Vaughn L. Mower and Kent R. Bruening, entitled "System and Method for Generating and Acquiring Pseudo-Noise (PN) Spread Signals" and filed on Jan. 28, 2002. The disclosure of the above-referenced Non-provisional Patent Application is incorporated by reference herein in its entirety to the extent it does not conflict with the teachings presented herein.

BACKGROUND OF THE INVENTION

1. Field of the Invention

The present invention relates to spread spectrum communication systems using PN coding techniques and, more particularly, to linear PN code searching to determine PN composite code phase.

2. Prior Art

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver the signal is de-spread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code chip rate, which in turn may be an integer multiple of the symbol rate $R_s$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of 2n frequency positions. The receiver follows the same frequency hop pattern. FHSS systems are also well known in the art and need not be discussed further.

As noted, the DSSS system PN-code sequence spreads the data signal over the available bandwidth such that the signal appears to be noise-like and random; but the signal is deterministic to a receiver applying the same PN-code to de-spread the signal. However, the receiver must also apply the same PN-code at the appropriate phase in order to de-spread the incoming signal, which explicitly implies synchronization between the receiver and transmitter. However, in group communication environments, such as a fleet battle-group where the battle-group composition changes regularly (daily or even hourly); or where the participants are engaged in a common training exercise, but geographically dispersed around the globe, typical synchronization techniques, such as resetting the start of the PN code for all the participants, is not practical. Moreover, communication interruptions due to resetting PN codes at an arbitrary time seam, such as days, weeks, months, and years, in a battle-group environment could have undesirable consequences. As used herein, a time seam occurs when a fleet of platforms begins its PN code from the beginning of a time event, such as the Global Positioning System (GPS) day in which the fleet assembles. The convention used by the fleet is to ignore subsequent GPS day boundaries once communication among the fleet has begun, meaning that the PN code shared among the fleet is not reset at subsequent GPS day boundaries.

In this manner, PN encoded communications can persist for two or three days. However, a platform that attempts to join the fleet and participate in fleet communications, subsequent to the beginning of the time event is confronted with a time and PN code phase ambiguity and will be unable to join fleet communications unless the ambiguities are resolved.

Some PN systems may be able to partially correlate the incoming composite PN-encoded signal with just one of the PN component codes, but at a reduced power level. Phase alignment with the other PN component codes may then be determined through information provided by the transmitting system. However, this approach has the disadvantage of bounding data rates by epochs of the partially phase aligned PN code.

Some systems may use three-component PN codes where acquisition is often achieved by searching (slipping or advancing) each PN component code for phase alignment with the composite PN-encoded signal one chip at a time; otherwise known as brute force searching. It will be appreciated that a disadvantage in brute force searching is that composite code phase is not preserved.

It will be appreciated that a disadvantage of advancing component PN codes, (i.e., independently withholding one or more clock cycles from the individual component PN code generators) is that phase information derived from the partially phase aligned composite PN-encoded signal is lost and must be regained.

In order to preserve knowledge of the partially aligned PN code phase, the entire composite code phase is slipped by one chip. Yet, this method is only valid for the first component code that is brute force searched.

With X-epoch synchronous data, $\theta_{PN}$ is preserved by composite code slipping, and $\theta_{PN}$ status ($\Delta\theta$ and TSI) may be recovered from the transmitted data stream since data may be recovered when there is partial phase alignment and bit synchronization (i.e., data edges are coincident with X-epochs).

With XY-epoch synchronous data, $\theta_{PN}$ is preserved through the X search phase but is likely to be lost during the brute force Y search phase. Yet, bit synchronization (data recovery) can only occur after X and Y phase alignment with the composite PN code.

It is therefore desirable to provide a method and system whereby information regarding composite PN code phase information is not lost when independently slipping or advancing component PN codes.

SUMMARY OF THE INVENTION

The foregoing and other problems are overcome, and other advantages are realized, in accordance with the presently preferred embodiments of these teachings.

In accordance with one embodiment of the present invention a receiver system for acquiring pseudo-noise (PN) spread signals is provided. The receiver system includes a receiver adapted to receive PN encoded signals and at least three receiver pseudo-noise (PN) component code generators: $PN_x$, $PN_y$, and $PN_z$. Each PN component code generator is adapted to generate relatively prime PN component codes when compared with each of the other PN component code generators.

In accordance with another embodiment of the present invention, a method for correlating receiver Psuedo-Noise (PN) composite phase with a received PN composite encoded signal is provided. The method includes providing at least three PN component codes, wherein the at least three PN component code lengths are relatively prime. The method also includes correlating a received PN composite encoded signal with one of the PN component codes and searching for phase alignment of the received PN composite encoded signal with a second one of the PN component codes. The method determines correlation of the received PN composite encoded signal with the receiver PN composite phase.

In accordance with another embodiment of the invention a method for correlating a received Pseudo-Noise (PN) encoded signal encoded by a first composite PN code generated by a first composite PN code generator is provided. The method includes providing a second composite PN code, which includes providing first, second and third PN component code generators for generating first, second, and third PN component codes, respectively. The method also includes partially correlating the received PN encoded signal with the first PN component code and partially correlating the received PN encoded signal with the second PN component code. Partially correlating the second PN component code includes withholding a clock signal from the second PN component code generator while clocking the first and third PN component code generators. After partially correlating the first and second PN component codes, the method substantially aligns the second composite PN code with the first composite PN code according to the partially phase aligned first and second PN component codes.

The invention is also directed towards an integrated circuit (IC). The IC includes at least three receiver pseudo-noise (PN) component code generators $PN_x$, $PN_y$, and $PN_z$. Each PN component code generator is adapted to generate relatively prime PN component codes when compared with each of the other PN component code generators. The IC also includes a Normalized Autonomous Phase Number (NAPN) generator for generating NAPNs associated with each relatively prime PN component code.

The invention is also directed towards a program storage device readable by a machine, tangibly embodying a program of instructions executable by the machine to perform method steps for correlating receiver Psuedo-Noise (PN) composite phase with a PN encoded received signal phase. The method includes providing at least three PN component codes, wherein the at least three PN component code lengths are relatively prime. The method also includes partially correlating a received PN composite encoded signal with one of the PN component codes and searching for phase alignment of the received PN composite encoded signal with a second one of the PN component codes. Data from the partial phase alignments are then used to correlate the received PN composite encoded signal with the receiver PN composite phase.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

As disclosed herein, the present invention describes a novel method and system for PN code phase coordination and alignment of direct sequence spread spectrum signals.

Figure 1:
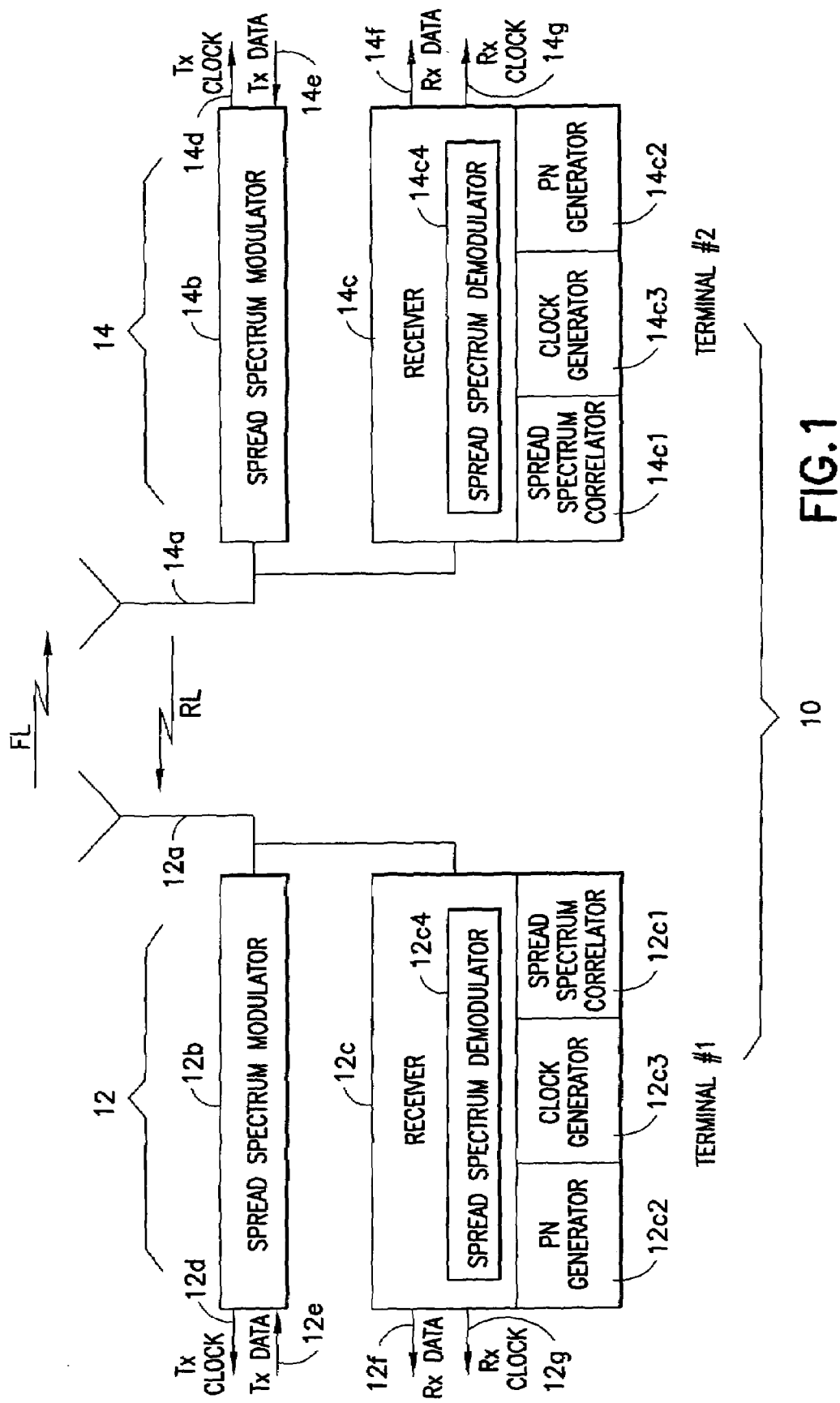
FIG. 1 is a pictorial diagram of a communication system having a transmitter and a receiver incorporating features of the present invention.

Referring to FIG. 1, there is shown a pictorial diagram of a telecommunications system incorporating features of the present invention. Although the present invention will be described with reference to the embodiments shown in the drawings, it should be understood that the present invention might be embodied in many alternate forms of embodiments, e.g., point-to-point simplex links, point-to-multipoint links, and either simplex or full-duplex links. In addition, it should be understood that the teachings herein may apply to any group or assembly of spread spectrum (SS) receivers, including those that are fixed in place; vehicle mounted; and/or hand carried.

Still referring to FIG. 1, there is shown a full-duplex system 10 that is suitable for practicing this invention. Specifically, the system 10 employs direct sequence spread spectrum based techniques over an air link to provide data transfer between Terminal #1 12 and Terminal #2 14. The forward link (FL) from Terminal #1 12 to Terminal #2 14 contains a spread spectrum waveform that is constructed in the manner described herein, with the PN code being composed of even-length and maximal length codes. In a similar manner, the return link (RL) from Terminal #2 14 to Terminal #1 12 contains a spread spectrum waveform that is similar or identical to that of the FL. It will be appreciated that an advantage of the present invention allows the data rates of the FL and RL to be changed synchronously and seamlessly at the transmit or receive (modulator and demodulator) ends of the link without the need for bit synchronizers.

Still referring to FIG. 1, Terminal #1 12 includes a Spread Spectrum Modulator (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. Terminal #1 12 also includes an antenna 12a, which may transmit at any suitable RF frequency.

The signal generated by Terminal #1 12 and transmitted by antenna 12a via the FL is received by Terminal #2 14 via antenna 14a to receiver 14c. Receiver 14c includes a spread spectrum correlator 14c1, PN generator 14c2, clock generator 14c3, and spread spectrum demodulator (SSD) 14c4. The received signal is then demodulated by SSD 14c4. Once the signal is acquired and the receiver 14c is tracking the received signal, the Rx Clock 14g and Rx Data 14f are output to the intended user. It will be appreciated that the data clocks 14g and 12d are synchronous and may be commanded to change frequency on the PN epochs; thus advantageously providing means to vary the data rate without interruption; and without the need for bit synchronizers to acquire and track at the new clock frequency with their associated loss of clock coherence between the transmitter and receiver.

Similarly, Terminal #2 14 generates a Tx Clock 14d and Tx Data 14e using the Spread Spectrum Modulator 14b in a similar fashion described earlier for Terminal #1. Likewise, Terminal #1 12 may receive the RL signal via antenna 12a, and demodulate and track the signal as described earlier with receiver 12c to provide Rx Data 12f and Rx Clock 12g to the intended user.

Figure 2:
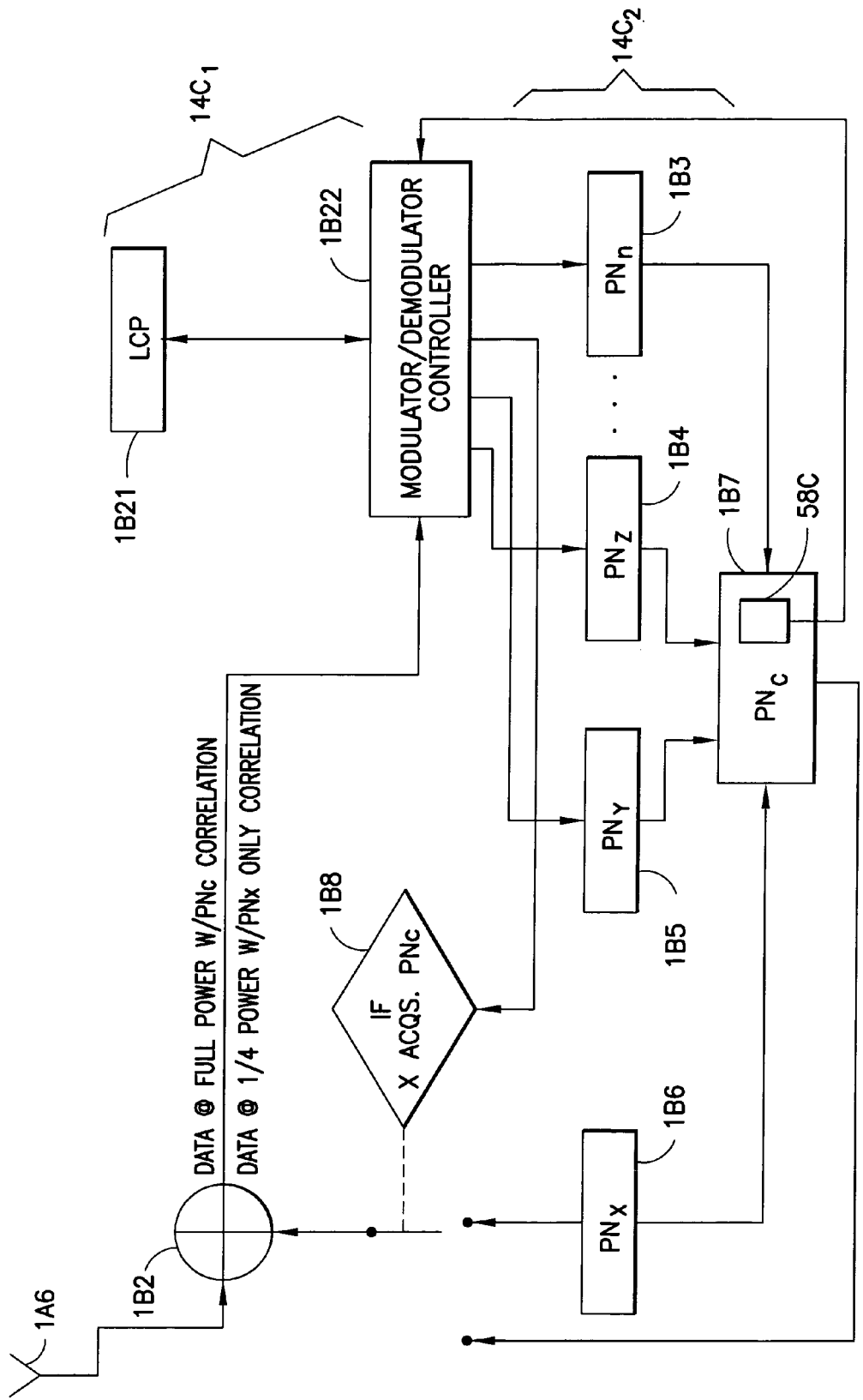
FIG. 2 is a block diagram of spread spectrum correlator shown in FIG. 1.

As shown in FIG. 2, each terminal 12, 14 shown in FIG. 1, contains a correlator controller 14c1, and a PN code generator 14c2. Correlator controller 14c1 includes, as shown in FIG. 2, a receiving system 1A6, a correlator 1B1, a link control processor (LCP) 1B21, and modulator/demodulator controller (MDC) 1B22. PN code generator 14c2 includes PN subcomponent generators, 1B3-1B6, PN composite code logic combiner 1B7, and a decision switch 1B8. PN composite code logic combiner 1B7 also contains phasor 58C for generating phase adjustment steps in accordance with teaching of the present invention. In alternate embodiment any suitable number of PN subcomponent generators may be used.

MDC 1B22 tests for X-code acquisition. When it has found X-code phase, its bus data controller (not shown) alerts LCP 1B21. In accordance with features of the present invention, LCP 1B21 uses remote and local PN code phase data to calculate slip commands to MDC 1B22 in order to achieve full correlation, and therefore full power. The receiving platform aligns its Y and Z codes with the received PN sequence by slipping or advancing its Y and Z component codes to the composite code phase of the received PN sequence.

In a preferred embodiment of the present invention a composite PN code PNc contains PN component codes, each component code being relatively prime with respect to the other component codes. In other words each of the component codes does not share any prime multiplicands with either of its companion component codes. For example, consider three component codes: X, Y, and Z; where Length (L) $L_x=5$ chips, $L_y=7$ chips, and $L_z=9$ chips. It can be seen that the numbers 5 and 7 are prime numbers, and the number 9 is derived from the prime number 3, meaning that the numbers 9, 5 or 7 do not share any prime multiplicands.

The epoch of a component code occurs once per the length of the component code, and the epoch is customarily recognized as the all-ones state of the PN component code generator. In accordance with features of the present invention, the major epoch of a composite $PN_c$ code occurs once per the length of the composite code ($L_x \times L_y \times L_z = L_{xyz}$) and is recognized as the simultaneous occurrence of the all-ones state of each component code. A major epoch occurs once and only once per $L_{xyz}$ if, and only if, composite PN codes are relatively prime as in a preferred embodiment of the present invention. In the case of the example code, the composite PN code length $L_{xyz}$ is 315 chips (5×7×9=315 chips).

Figure 3:
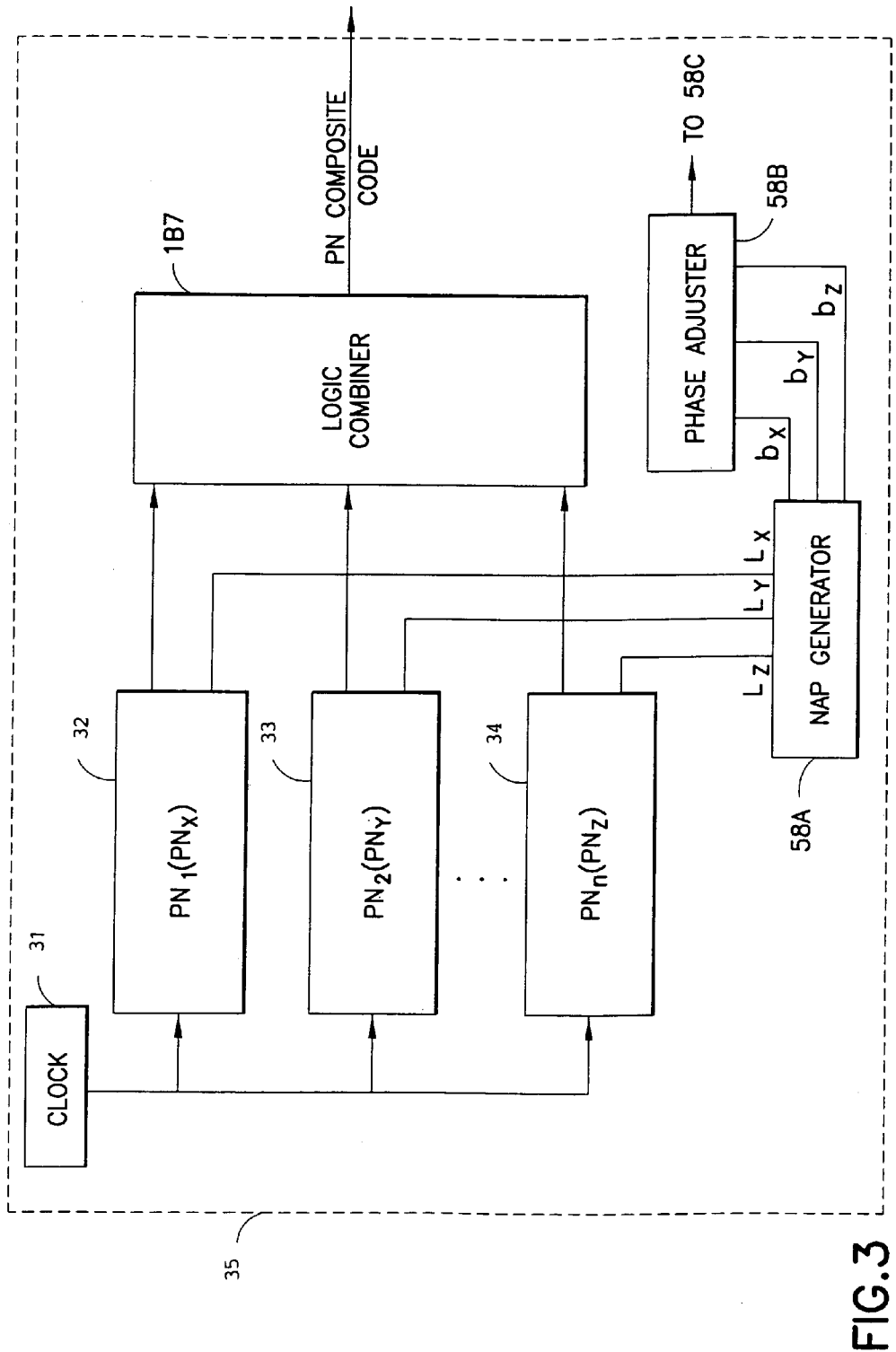
FIG. 3 is a block diagram of the composite PN code generator shown in FIG. 1 incorporating features of the present invention.

Referring now to FIG. 3, a PN Composite Code advances one chip through its unique PN code sequence for every cycle of the master clock 31 driving the PN component code generators 32–34. In some applications, it is necessary to know the PN composite code phase at all times (i.e., the phase position within the PN composite code sequence). Determining phase position is complicated when PN code manipulations are performed. As employed herein PN code manipulation may include: slips by a known number of chips, advances by a known number of chips, composite code searches by a known number of chips, and/or linear searches of individual component codes.

When an individual component code is searched chip by chip (linear searching) a clock cycle from clock 31 is withheld from a PN code generator but not from the other PN code generators, allowing the clocked PN code generators to progress through their sequence, the composite PN code phase experiences a deterministic phase advance for each chip searched. The invention presented herein teaches the means by which composite PN code phase is maintained in consequence of linear searches during signal acquisition.

As shown in Table 1, the example composite code begins with its composite PN code phase ($\theta_{xyz}$) of zero. For each clock cycle, each component code rotates through its phase modulo its code length. In other words, the X code of 5 chips rotates through phases 1 2 3 4 0 1 2 3 4 0 et cetera, which is the composite code phase modulo 5. After an arbitrary 211 clock cycles, the PN code has advanced 211 chips. $\theta_{xyz}=211$ chips, $\theta_x=1$, $\theta_y=1$, and $\theta_z=4$.

TABLE 1

$\theta_x = 0$ ⎧ 211 clock ⎫ $\theta_x = 211$ MOD $5 = 1$
$\theta_y = 0$ ⎨ cycles ⎬ $\theta_y = 211$ MOD $7 = 1$
$\theta_z = 0$ ⎩ occur ⎭ $\theta_z = 211$ MOD $9 = 4$ Delta Phase In order to correlate a receiver PN code with a transmitter PN code the spread spectrum modulator (FIG. 1, item 14c4) advances or slips the receiver PN code phase by withholding clock cycles to PN component code generators. For example (see Table 2) beginning with $\theta_{xyz}=53$, the 5/7/9 PN code can be slipped 92 chips, and $\theta_{xyz}$ is examined at the $253^{rd}$ clock cycle (200 clock cycles following $\theta_{xyz}=53$).

TABLE 2

| $\theta_{xyz} = 53$ | | Slip | | $\Delta\theta_{xyz} = 92$ | | 200 | | $\theta_{xyz} = 53 + 200 - 92 = 161$ |
|---|---|---|---|---|---|---|---|---|
| $\theta_x = 53 \text{ MOD } 5 = 3$ | | | | $\Delta\theta_x = 92 \text{ MOD } 5 = 2$ | | clock | | $\theta_x = (3 + 200 - 2) \text{ MOD } 5 = 1 = 161 \text{ MOD } 5$ |
| $\theta_y = 53 \text{ MOD } 7 = 4$ | | 92 | | $\Delta\theta_y = 92 \text{ MOD } 7 = 1$ | | cycles | | $\theta_y = (4 + 200 - 1) \text{ MOD } 7 = 0 = 161 \text{ MOD } 7$ |
| $\theta_z = 53 \text{ MOD } 9 = 8$ | | chips | | $\Delta\theta_z = 92 \text{ MOD } 9 = 2$ | | later | | $\theta_z = (8 + 200 - 2) \text{ MOD } 9 = 8 = 161 \text{ MOD } 9$ |

Slipping occurs as part of the 200 clock cycles. For the X component code, 2 of the 200 clock cycles are withheld from the X-code generator, 1 from the Y-code generator, and 2 from the Z-code generator. The result is a delta composite code phase ($\Delta\theta_{xyz}$) of 92 chips. This example demonstrates a composite PN code phase equation:

$$\theta_{PN} = \#CLKs_{\to Chips} + \Delta\theta_{XYZ} \qquad (Eq. 1)$$

(Eq. 1 shows that the composite PN code phase of a PN sequence is equal to the number of clock cycles counted plus the delta composite PN code phase. In alternate embodiments, the master clock may run at many times the chipping rate, meaning that a chip may be 2, 4, or more clock cycles long. For the example above, the composite PN code phase is equal to (53+200)−92=161 chips.

Alternatively, a similar process can be used to advance PN code phase within a sequence. For example, beginning with a PN composite code phase of 53 chips, advance 211 chips, and examine the PN composite code phase 50 clock cycles later (one clock cycle per chip) (see Table 3). Advancing through a PN code sequence is equivalent to slipping through the code by an amount equal to the length of the code minus the advance amount (slip=315−211=104).

while one component code is advanced one phase position by the clock cycle. Thus, enabling one component code to be advanced by one clock cycle, while withholding clock cycles to companion components codes is equivalent to advancing through the PN composite code by the unique number of chips that results in a phase advance of one to the enabled PN code generator, and results in a phase advance of zero to all companion component code generators. In other words, the companion component codes are moved an (equivalent number of chips equal to an) integer number of their epochs that results in a component code phase of one to the enabled component code. This phase relationship can be expressed as:

$$b_{PN_x} \times [L_{(PN_y \times PN_z)} \text{MOD } L_{PN_x}] = 1$$

$$b_{PN_y} \times [L_{(PN_z \times PN_x)} \text{MOD } L_{PN_y}] = 1 \qquad (Eq. 2)$$

$$b_{PN_z} \times [L_{(PN_x \times PN_y)} \text{MOD } L_{PN_z}] = 1$$

Eq 2, a 3-component code case, shows that an integer, $b_x$, times an integer YZ epoch number of chips $L_{yz}$, results in an X-code phase of 1. Similarly for companion codes Y and Z, as shown in Eq. 2. Using the 5/7/9 PN code example, $b_x$

TABLE 3

| $\theta_{xyz} = 53$ | | Advance | | $\Delta\theta_{xyz} = +211 = 315 - 104$ | | 50 | | $\theta_{xyz} = 53 + 211 + 50 = 314$ |
|---|---|---|---|---|---|---|---|---|
| $\theta_x = 53 \text{ MOD } 5 = 3$ | | | | $\Delta\theta_x = 104 \text{ MOD } 5 = 4$ | | clock | | $\theta_x = (3 + 50 - 4) \text{ MOD } 5 = 4 = 314 \text{ MOD } 5$ |
| $\theta_y = 53 \text{ MOD } 7 = 4$ | | 211 | | $\Delta\theta_y = 104 \text{ MOD } 7 = 6$ | | cycles | | $\theta_y = (4 + 50 - 6) \text{ MOD } 7 = 6 = 314 \text{ MOD } 7$ |
| $\theta_z = 53 \text{ MOD } 9 = 8$ | | chips | | $\Delta\theta_z = 104 \text{ MOD } 9 = 5$ | | later | | $\theta_z = (8 + 50 - 5) \text{ MOD } 9 = 8 = 314 \text{ MOD } 9$ |

The advance occurs as part of the 50 clock cycles. For the X component code, 4 of the 50 clock cycles are withheld from the X-code generator, 6 from the Y-code generator, and 5 from the Z-code generator. The result is a composite code phase ($\theta_{xyz}$) of 314 chips.

Normalized, Autonomous Phase Numbers

A linear search refers to a chip-by-chip search for zero phase of a component code. Considering now what occurs when one of three component codes advances one phase position relative to its companion component codes; a clock cycle is withheld from all companion component codes equals 2, meaning that in 2 YZ epoch number of chips, the X code has a phase of 1 as shown in Eq. 3:

$$2 \times (7 \times 9) = 2 \times 63 = 126 \text{ and } 126 \text{ MOD } 5 = 1 \qquad (Eq. 3)$$

Thus, a YZ epoch number of chips is 63, and in 2 YZ epoch number of chips, 126, the X code has a phase of 1.

Figures 4, 4A, 4B:
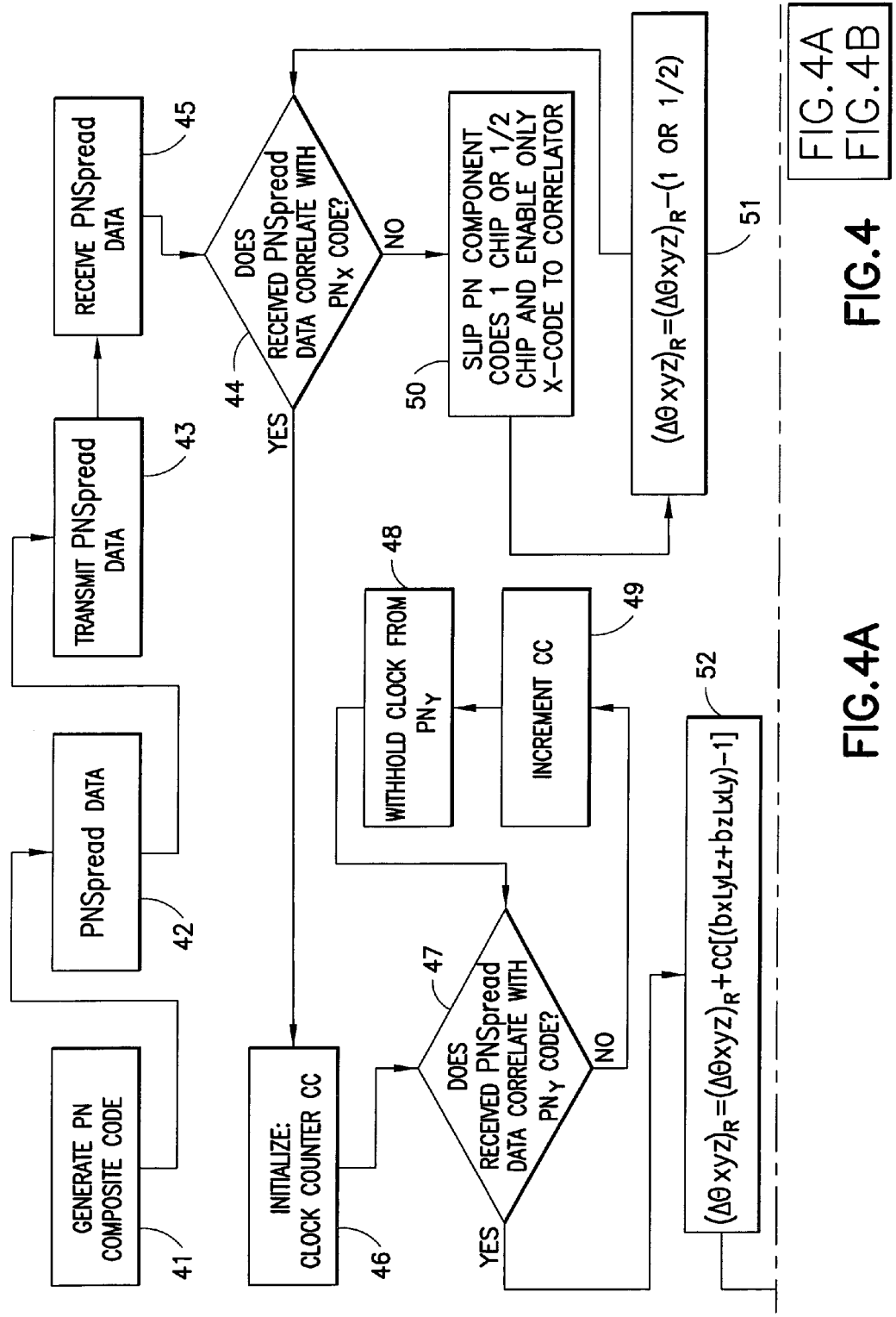
FIG. 4 is a method flow chart implementing features of the present invention shown in FIGS. 1, 2, and 3.
Figure 4B:
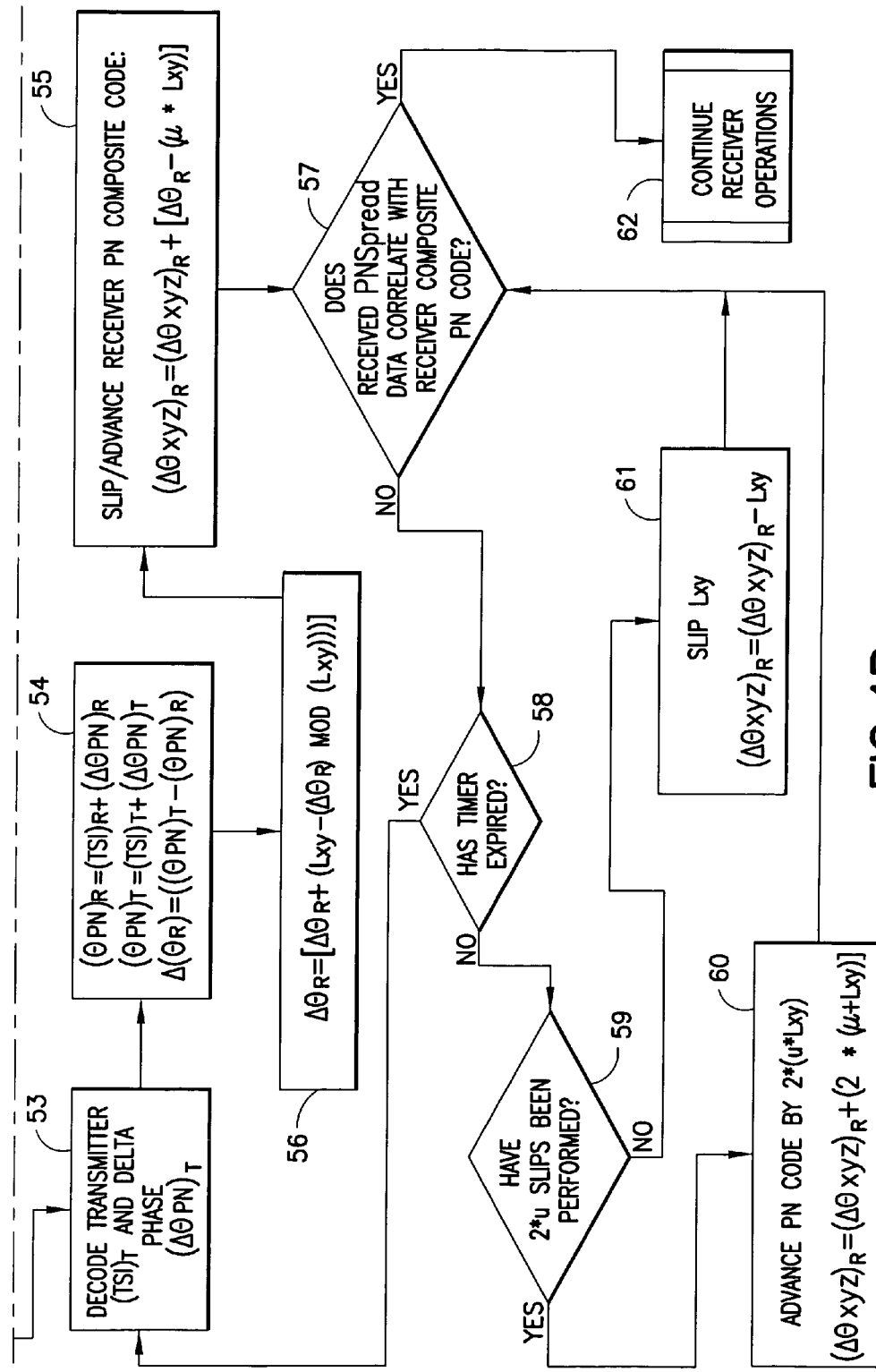

Beginning with a PN composite code phase of 101 chips, advance the X code 1 phase position relative to its companion component codes by withholding one clock cycle to each of the companion component codes, and examine the PN composite code phase an arbitrary 50 clock cycles later (one clock cycle per chip), as shown in FIG. 4.

TABLE 4

| $\theta_{xyz} = 101$ | | Advance | | 50 | | $\theta_{xyz} = 101 + 50 + 126 - 1 = 276$ |
|---|---|---|---|---|---|---|
| $\theta_x = 101 \text{ MOD } 5 = 1$ | | X Code | | clock | | $\theta_x = (1 + 50 - 0) \text{ MOD } 5 = 1 = 276 \text{ MOD } 5$ |
| $\theta_y = 101 \text{ MOD } 7 = 3$ | | 1 Phase | | cycles | | $\theta_y = (3 + 50 - 1) \text{ MOD } 7 = 3 = 276 \text{ MOD } 7$ |
| $\theta_z = 101 \text{ MOD } 9 = 2$ | | position | | later | | $\theta_z = (2 + 50 - 1) \text{ MOD } 9 = 6 = 276 \text{ MOD } 9$ |

It will be appreciated from Table 4 that the composite PN code phase does not advance exactly by 126 chips; it advances by 125, which takes into account the apparent slip of one composite chip. The apparent slip of one composite chip is advantageously accounted for when counting every single clock cycle as part of a phase maintenance program. Returning to the example, each time the X component code is advanced one phase position relative to its companion component codes, the composite PN code phase advances 125 chips. If the X component code is advanced n number of phase positions relative to its companion component codes, the composite PN code phase advances n×125 chips. Knowing the composite code phase advances (125 chips in the example) due to the relative advance of one phase position (i.e., normalized to a relative phase advance of one), the composite code phase advance due to any number of one-component-code-only advances can be determined. This number is autonomous because it does not affect (and is independent of) the phase positions of companion component codes.

The $b_x$, $b_y$, and/or $b_z$ coefficients, referred to here as Normalized, Autonomous Phase Numbers (NAPNs), are preferably determined empirically but in alternate embodiments of the current invention, the NAPNs may be determined by any suitable method. It will be appreciated that in some embodiments not all the NAPNs need to be determined. NAPNs are unique for a given set of fixed-length component codes. In alternate embodiments the modulo identity shown in Eq. 4 can be used to keep inproducts as small as possible, given the possibility that PN termediate component code lengths can be very long, resulting in very large products.

$$(A \times B \times C) \text{MOD } E = \{[(A \times B) \text{MOD}(E)] \times C\} \text{MOD}(E) \quad \text{(Eq. 4)}$$

Using Eq. 4, the set of equations shown in Eq. 2 can be rewritten as follows:

$$b_x \times (L_{yz} \text{MOD } L_x) \text{MOD } L_x = 1$$

$$b_y \times (L_{xz} \text{MOD } L_y) \text{MOD } L_y = 1$$

$$b_z \times (L_{xy} \text{MOD } L_z) \text{MOD } L_z = 1$$

$$b_1 \times (L_{2n} \text{MOD } L_1) \text{MOD } L_1 = 1 \quad \text{(Eq. 5)}$$

NAPNs can be as large as the length of the respective component code, which potentially makes the product of b times its companion codes very large. The last equation in the set of Eq. 5 is written in terms of $b_1$ and $L_{2n}$, which indicates that the teachings of the present invention applies to PN codes comprised of any number of component codes. The term $b_1$ indicates the code of interest, of length $L_1$, whose b is being sought. The product of lengths of all companion component codes is $L_{2n}$, which indicates the length of code $2 \times L_3 \times \ldots \times L_n$.

By performing empirical searches of the example 5/7/9 PN code, its b's are determined: $b_x=2$, $b_y=5$, and $b_z=8$. As shown in Table 5, withholding 3 XZ clock cycles has the effect of advancing the PN composite code by Y's NAPN (5) times the length of an XZ Epoch number of chips (less 1 for each withheld clock) times 3. Referring to Table 5 it will be appreciated that advancing 3 phase positions of the Y Code effects a PN composite code phase advance of 672 chips (3×224); the advance of 672 chips plus the starting phase of 23 chips plus 50 clock cycles results in the PN code sequence advancing through its code length twice plus an additional 115 chips (2×315+115=745). The allowance of 50 clock cycles intends to indicate that the PN code phases are inspected at an arbitrary point in time sufficient to allow clock cycles to be withheld.

TABLE 5

| | | |
|---|---|---|
| $\theta_{xyz} = 23$ | Withhold 3 XZ clock cycles & 50 clock cycles later... | $\theta_{xyz} = 23 + 3 \times 224 + 50 = 745$ MOD $315 = 115$ |
| $\theta_x = 23$ MOD $5 = 3$ | | $\theta_x = (3 + 50 - 3)$ MOD $5 = 0 = 115$ MOD $5$ |
| $\theta_y = 23$ MOD $7 = 2$ | | $\theta_y = (2 + 50 - 0)$ MOD $7 = 3 = 115$ MOD $7$ |
| $\theta_z = 23$ MOD $9 = 5$ | | $\theta_z = (5 + 50 - 3)$ MOD $9 = 7 = 115$ MOD $9$ |

In a preferred embodiment, Y-generator clock cycles can be withheld and X and Z generators can be clocked in order to linearly search the Y code. In this embodiment, the NAPNs of the X and Z codes are used. When one clock cycle is withheld from the Y-code generator of the 5/7/9 code, the PN composite code phase advances by $((b_x \times L_{yz} + b_z \times L_{xy}) - 1)$, which equals $2 \times 7 \times 9 + 8 \times 5 \times 7 - 1$ (for the withheld clock)=405). This approach is shown in Table 6.

TABLE 6

| | | | |
|---|---|---|---|
| $\theta_{xyz} = 223$ | Withhold 3 Y code clock cycles | 50 clock cycles later | $\theta_{xyz} = (223 + 50 + 3 \times 405)$ MOD$(315) = 228$ |
| $\theta_x = 223$ MOD $5 = 3$ | | | $\theta_x = (3 + 50 - 0)$ MOD $5 = 3 = 228$ MOD $5$ |
| $\theta_y = 223$ MOD $7 = 6$ | | | $\theta_y = (6 + 50 - 3)$ MOD $7 = 4 = 228$ MOD $7$ |
| $\theta_z = 223$ MOD $9 = 7$ | | | $\theta_z = (7 + 50 - 0)$ MOD $9 = 3 = 228$ MOD $9$ |

Large-number Example

The details of a 2047/4095/8191 PN code are given in Tables 7 and 8. Each time an XZ clock cycle is withheld, the PN composite code phase advances $b_y \times L_{xz} - 1 = 4093 \times 2047 \times 8191 - 1 = 68{,}627{,}236{,}860$ chips.

TABLE 7

| | |
|---|---|
| $L_x = 2^{11} - 1 = 2047 = 23 \times 89$ | $b_x = 1365$ |
| $L_y = 2^{12} - 1 = 4095 = 3^2 \times 5 \times 7 \times 13$ | $b_y = 4093$ |
| $L_z = 2^{13} - 1 = 8191 = 8191$ | $b_z = 2733$ |
| $L_{xyz} = 2047 \times 4095 \times 8191 = 68{,}660{,}770{,}815$ | |

TABLE 8

| | | |
|---|---|---|
| $\theta_{xyz} = 660E6$ chips | ⎧ Withhold 9000 ⎫ | $\theta_{xyz} = (66E7 + 9E3 \times 68{,}627{,}236{,}860 + 1E8) \, MOD \, L_{xyz} = 42{,}258{,}259{,}075$ |
| $\theta_x = \theta_{xyz} \, MOD \, 2047 = 119$ | ⎨ XZ clockcycles & ⎬ | $\theta_x = (119 + 100E6 - 9000) \, MOD \, 2047 = 1310 = \theta_{xyz} \, MOD \, 2047$ |
| $\theta_y = \theta_{xyz} \, MOD \, 4095 = 660$ | ⎨ monitor phase ⎬ | $\theta_y = (660 + 100E6 - 0) \, MOD \, 4095 = 760 = \theta_{xyz} \, MOD \, 4095$ |
| $\theta_z = \theta_{xyz} \, MOD \, 8191 = 1984$ | ⎩ after 1E8 clocks ⎭ | $\theta_z = (1984 + 100E6 - 9000) \, MOD \, 8191 = 5447 = \theta_{xyz} \, MOD \, 8191$ |

The first-measured PN composite code phase is $660 \times 10^6$ chips; 9000 XZ clock cycles are withheld in an effort to find zero phase of the Y code; due to the probability of detect it may require more than one search through the Y-code. PN component code phases are examined $100 \times 10^6$ clock cycles after $\theta_{xyz} = 660 \times 10^6$ chips. It should be noted that even though this PN code has a length of 68+ billion chips, it repeats itself every 11.4 minutes at a 100 Mc/s chipping rate. The intermediate product of $9000 \times 68{,}627{,}236{,}860$ is $617{,}645{,}131{,}740{,}000$, which is a 50-bit number.

Thus, the movement of a single component code phase relative to its companion component codes advantageously, in accordance with the teachings of the present invention, results in a deterministic phase advance. This advance is equal to a NAP Number of companion epochs, expressed in chips, less 1 for each withheld clock cycle. Similarly, in accordance with features of the present invention, withholding clock cycles from a component code results in a relative advance of the companion component codes.

Referring also to FIG. 4, there are shown method steps for a preferred embodiment of the present invention. A partial or X-code acquisition begins with receiving a data signal spread by the PN even length code, step 45. The PN spread data signal is tested for phase alignment with the local X-component code, step 44. If phase alignment is not achieved, the PNc is slipped, step 50 until the X-code partially correlates with the XYZ coded signal. Step 50 slips the PN composite code (PNc) in either whole chip or by ½ chip increments. In the preferred embodiment, the X-component code is used for partial phase alignment. However, in alternate embodiments any suitable PN component code could be used. Step 51 maintains the slipped delta phase history $\Delta\theta_{xyz}$.

Once step 44 determines phase alignment with the local X-component code, the receiving platform's X code is in phase alignment with the received PN code sequence. However, X-code-only alignment is a partial phase alignment; Y and Z codes have not been phase aligned, and the correlated portion of the signal is substantially ¼ of the transmitted signal power or 6 dB down. Step 46 initializes clock counter CC and step 47 tests the received PN signal with the Y-component of the PNc composite code. A failure to correlate in step 47 results in step 49 incrementing the CC counter and in step 48 withholding a clock signal from the Y-component generator (FIG. 3, item 53). Once the Y-component correlates with the received PN signal step 52 determines $\Delta\theta_{XYZ_R}$ in accordance with features of the present invention. At this point, the receiver is in partial XY phase alignment with the received signal.

Step 53 decodes transmitter time-since-initialization $(TSI)_T$ and transmitter delta phase $\Delta\theta_{PN_T}$. Step 54 then determines the phase of the receiver composite PNc code using the receiver's $(TSI)_R$ and delta phase $\Delta\theta_{PN_R}$. Step 54 also determines the difference phase $\Delta\theta_R$ between $\Delta\theta_{PN_T}$ and $\Delta\theta_{PN_R}$. Step 56 adds a modulo number of chips to $\Delta\theta_R$ to account for the already partially aligned XY code. Step 55 slips or advances local PNc by $\Delta\theta_R$ plus the length of the XY code times an uncertainty factor μ. Step 57 tests the received PN spread signal with the slipped (or advanced) local PNc.

If the received PNc spread signal correlates with the receiver PNc signal step 62 continues with receiver operations.

If the received PNc spread signal doesn't correlate with the receiver PNc signal, then step 58 tests for an expired timer. It will be appreciated that the timer may be set to any suitable timer period. Step 59 then determines if (2*μ) slips have been performed. If yes then the PNc code is advanced by a factor and the delta phase $\Delta\theta_{XYZ_R}$ is adjusted by the same factor. In a preferred embodiment the factor is twice the uncertainty times the length of the XY components of the PNc code. In alternate embodiments the factor may be any suitable factor. Step 57 again tests for phase alignment. Returning to step 58, if the timer has expired then step 53 again decodes the transmitter TSI and transmitter delta phase. This continues until step 57 determines full correlation of the receiver PNc composite code with the received signal encoded by the transmitter PNc composite code.

It will be appreciated by those skilled in the art that the ability of aligning two of the component code phases before full PN code correlation allows for an increased selection of data rates. For example, if data rates are constrained to be X-epoch synchronous then the symbol rate constraint is that a symbol must be an integer number of chips in duration, divisible by an X-epoch multiplicand. Thus, for a PNX component code of 1024, only powers of 2 (up to 10) may be used to divide the symbol rate. One advantage of the present invention is to partially correlate on at least two of the PN component codes. Thus, for the $PN_x$ component code of 1024 and now, for example, a $PN_y$ component code of 10,395 (3*5*7*9*11), any symbol rate divisible by $2^{n}*\{1, 3,5,7,9,11\}$, where n=10, may be used.

It should be understood that the foregoing description is only illustrative of the invention. Various alternatives and modifications can be devised by those skilled in the art without departing from the invention. For example, in alternate embodiments using four component codes, any suitable method (FIG. 3, item 1B7) for combining component codes and generating NAPNs (FIG. 3, item 58A) may be used; MAND combined codes, which exclusively-OR combine one of the PN component codes with a logical AND result of two other of the PN component codes, may be used to generate a composite PN code. MAJ combined codes, which exclusively-ORs all logical AND combinations of unique pairs of the PN component codes, may be used in place of MAND combined codes. For example, MAJ for a 4-component - code sequence:

$XYZ_1Z_2$: MAJ=(X•Y)⊕(X•$Z_1$)⊕(X•$Z_2$)⊕(Y•$Z_1$)⊕(Y•$Z_2$)⊕($z_1$•$Z_2$)

In addition, in alternate embodiments any suitable number of component codes may be used. Referring to FIG. 3 there is shown one such possible alternative embodiment. It will be appreciated that items 31–34, 58A, 58B, and 1B7, can be individual components or an integrated circuit (IC), item 35. Still referring to FIG. 3 it can be seen that the NAPNs may be generated by NAPN generator 58A. NAPN generator 58A may be any suitable device for generating NAPNs. For example, in alternate embodiments NAPN generator 58A may be a look-up-table stored in a memory or a programmable device programmed to determine NAPNs for a set of relatively prime PN codes. It will be further appreciated that the IC may be a field programmable gate array (FPGA), an application specific IC (ASIC), or a function of MDC firmware. The operation the ICs or firmware may be defined by a suitable programming language such as a Very High Speed Integrated Circuit (VHSIC) Hardware Description (VHDL) Language file. Accordingly, the present invention is intended to embrace all such alternatives, modifications and variances that fall within the scope of the appended claims.

What is claimed is:

1. A receiver system for acquiring pseudo-noise (PN) spread signals, comprising:

at least three receiver pseudo-noise (PN) component code generators PNx, PNy, PNz, wherein each PN component code generator is adapted to generate relatively prime PN component codes when compared with each of the other PN component code generators;

a demodulator adapted to generate a normalized autonomous phase number (NAPN) associated with each relatively prime PN component code, wherein each NAPN comprises the form:

$b_{PNx} * [L_{PNy*PNz} * \text{MOD } L_{PNx}] = 1$ $b_{PNy} * [L_{PNx*PNz} * \text{MOD } L_{PNy}] = 1$ $b_{PNz} * [L_{PNx*PNy} * \text{MOD } L_{PNz}] = 1$ where $b_{PN}$=NAPN of interest, and $-[L_{PN...*PN...}]$=epoch length of PN component codes; and a correlator adapted to correlate a received PN composite signal by advancing or withholding the received PN composite signal a number of chips determined from at least two of the NAPNs.

2. A receiver system as in claim 1, wherein the receiver system further comprises a receiver logic combiner coupled to the at least three receiver PN component code generators, the receiver logic combiner adapted to generate a composite PN code.

3. A receiver system as in claim 2 wherein the logic combiner comprises a MAND logic combiner that logically XOR combines an output of one of the PN component code generators with a logical AND result of at least two other of the PN component code generators.

4. A receiver system as in claim 2 wherein the logic combiner comprises a MAJ logic combiner that logically XOR combines all logical AND combinations of unique pairs of the PN component code generators.

5. A receiver system as in claim 1 wherein the at least three receiver PN component code generators comprise four first receiver PN component code generators.

6. A receiver system as in claim 1 wherein the demodulator is adapted to slip PN generators in accordance with NAPNs.

7. A method for determining Pseudo-Noise (PN) composite phase, the method comprising:

providing at least three PN component codes, wherein the at least three PN component codes are relatively prime;

partially correlating a received PN composite encoded signal with one of the PN component codes while tracking changes to a composite PN code phase that result therefrom;

generating a PN composite code by logically combining the at least three PN component codes;

using the tracked changes, determining a PN composite code phase; and fully correlating the received PN composite encoded signal using the determined PN composite code phase.

8. A method as in claim 7 wherein determining the PN composite code phase comprises:

determining normalized autonomous phase numbers associated with the each of the three relatively prime PN component codes.

9. A method as in claim 7 wherein generating the PN composite code is by logically combining the at least three PN component codes according to MAND logic that logically XOR combines at least one of the PN component codes with a logical AND result of at least two other of the PN component codes.

10. A method as in claim 7 wherein generating the PN composite code is by logically combining the at least three PN component codes according to MAJ logic that logically XOR combines all logical AND combinations of unique pairs of PN component codes.

11. A method for determining Pseudo-Noise (PN) composite phase comprising:

providing at least three PN component codes, wherein the at least three PN component codes are relatively prime;

determining normalized autonomous phase numbers NAPN associated with the each of the three relatively prime PN component codes;

partially correlating a received PN composite encoded signal with one of the PN component codes while slipping or advancing a second one of the PN component codes;

searching for phase alignment of the received PN composite encoded signal with the second one of the PN component codes;

for each clock cycle denied the second one of the PN component codes, advancing a PN composite code phase by:

$\{b_x * L_{yz}] + [(b_z) * L_{xy})]\} - 1$ (chips).

where b=the NAPN of the indicated PN component codes, and

L=the epoch length of the other two component codes;

until the received PN composite encoded signal is phase aligned with the second one of the PN component code phases; and fully correlating the received PN composite encoded signal with the PN composite code and the advanced PN composite code phase.

12. A method as in claim 11 wherein partially correlating the received PN composite encoded signal with a receiver PN composite code phase further comprises:

searching for phase alignment substantially in steps of the first and second PN component code lengths.

13. A method for correlating a received Pseudo-Noise (PN) encoded signal encoded by a first composite PN code generated by a first composite PN code generator, the method comprising:

providing a second composite PN code, wherein providing the second composite PN code further comprises:

providing first, second and third PN component code generators for generating first, second, and third PN component codes, respectively;

partially correlating the received PN encoded signal with the first PN component code;

partially correlating the received PN encoded signal with the second PN component code, wherein correlating the second PN component code comprises:

withholding a clock signal from the second PN component code generator, wherein withholding the clock signal further comprises:

clocking the first and third PN component code generators; and substantially aligning the second composite PN code with the first composite PN code according to the partially phase aligned first and second PN component codes.

14. A method as in claim 13 wherein the step of substantially aligning the second composite PN code with the first composite PN code further comprises the steps of:
determining a composite code delta phase;
determining an uncertainty factor; and
moving the second composite PN code in accordance with the composite code delta phase and the uncertainty factor.

15. A method as in claim 14 wherein determining the composite code delta phase further comprises:
determining a receiver composite code delta phase, wherein determining the receiver composite code delta phase further comprises:
determining receiver time since initialization (TSI);
determining a transmitter composite code delta phase, wherein determining the transmitter composite code delta phase further comprises:
determining transmitter TSI; and
combining the transmitter composite code delta phase and the receiver composite code delta phase to form the composite code delta phase.

16. A method as in claim 13 wherein providing the second composite PN code further comprises:
providing a fourth PN component code generator for generating a fourth PN component code.

17. A method as in claim 16 wherein the step of substantially aligning the second composite PN code with the first composite PN code further comprises combining the four PN component codes according to:

$(X \oplus (Y \cdot (Z_1 \oplus Z_1)))$.

18. A method as in claim 16 wherein the step of substantially aligning the second composite PN code with the first composite PN code further comprises combining the four PN component codes according to:

$(X \cdot Y)(X \cdot Z_1) \oplus (X \cdot Z_2) \oplus (Y \cdot Z_1) \oplus (Y \cdot Z_2) \oplus (Z_1 \cdot Z_2)$.

19. An integrated circuit (IC), wherein the IC comprises:
at least three receiver pseudo-noise (PN) component code generators PNx, PNy, PNz, wherein each PN component code generator is adapted to generate relatively prime PN component codes when compared with each of the other PN component code generators; and
a Normalized Autonomous Phase Number (NAPN) generator for generating NAPNs associated with each relatively prime PN component code, wherein each NAPN comprises the form:

$b(\text{sub } PNx)*[L(\text{sub } PNy*PNz)*\text{MOD } L(\text{sub } PNx)]=1$ $b(\text{sub } PNy)*[L(\text{sub } PNx*PNz)*\text{MOD } L(\text{sub } PNy)]=1$ $b(\text{sub } PNz)*[L(\text{sub } PNx*PNy)*\text{MOD } L(\text{sub } PNz)]=1$ where $b(\text{sub } PN)=NAPN$ and
$L(\text{sub } PN \ldots *PN \ldots)$=epoch length of combined codes and a correlator adapted to correlate a received PN composite signal by advancing or withholding the received PN composite signal a number of chips determined from at least two of the NAPNs.

20. An IC as in claim 19 wherein the NAPN generator comprises a memory.

21. An IC as in claim 19 wherein the NAPN generator comprises a programmable device.

22. An IC as in claim 19 wherein the IC further comprises a receiver logic combiner adapted to generate a receiver composite PN code.

23. An IC as in claim 22 wherein the logic combiner comprises a MAND logic combiner that logically XOR combines an output of one of the PN component code generators with a logical AND result of at least two other of the PN component code generators.

24. An IC as in claim 22 wherein the logic combiner comprises a MAJ logic combiner that logically XOR combines all logical AND combinations of unique pairs of the PN component code generators.

25. An IC as in claim 19 wherein the at least three receiver PN component code generators comprise four first receiver PN component code generators.

26. An IC as in claim 19 wherein the IC comprises an Application Specific IC (ASIC).

27. An IC as in claim 19 wherein the IC comprises a field programmable gate array (FPGA).

28. A program storage device readable by a machine, tangibly embodying a program of instructions executable by the machine to perform method steps for correlating receiver Pseudo-Noise (PN) composite phase with a PN encoded received signal phase, the method comprising:
providing at least three PN component codes, wherein the at least three PN component codes are relatively prime;
correlating a received PN composite encoded signal with one of the PN component codes;
searching for phase alignment of the received PN composite encoded signal with a second one of the PN component codes;
determining phase alignment of the received PN composite encoded signal with a third one of the PN component codes; and
fully correlating the received PN composite encoded signal by one of slipping or advancing the received PN composite encoded signal by an amount determined by the phase alignment of each of the at least three PN component codes.

29. A program storage device as in claim 28 wherein the program of instructions comprise at least one Very High Speed Integrated Circuit (VHSIC) Hardware Description (VHDL) Language file.

* * * * *